United States Patent
Kinoshita et al.

(10) Patent No.: US 11,320,408 B2
(45) Date of Patent: May 3, 2022

(54) GAS ANALYSIS DEVICE AND GAS ANALYSIS METHOD

(71) Applicant: NETZSCH-Gerätebau GmbH, Selb (DE)

(72) Inventors: Ryoichi Kinoshita, Shizuoka (JP); Hiroki Takaishi, Kanagawa (JP); Daisuke Ito, Tokyo (JP); Kenta Sato, Kanagawa (JP)

(73) Assignee: NETZSCH-Gerätebau GmbH, Selb (DE)

( * ) Notice: Subject to any disclaimer, the term of this patent is extended or adjusted under 35 U.S.C. 154(b) by 38 days.

(21) Appl. No.: 17/022,821

(22) Filed: Sep. 16, 2020

(65) Prior Publication Data

US 2021/0088485 A1    Mar. 25, 2021

(30) Foreign Application Priority Data

Sep. 20, 2019 (JP) .............................. JP2019-171947

(51) Int. Cl.
*G01N 30/72* (2006.01)
*G01N 5/04* (2006.01)
(Continued)

(52) U.S. Cl.
CPC ........... *G01N 30/7206* (2013.01); *G01N 5/04* (2013.01); *G01N 30/30* (2013.01); *H01J 49/004* (2013.01); *G01N 2030/025* (2013.01)

(58) Field of Classification Search
CPC ...... G01N 30/7206; G01N 5/04; G01N 30/30; G01N 2030/025; G01N 2030/085;
(Continued)

(56) References Cited

U.S. PATENT DOCUMENTS

| | | | | |
|---|---|---|---|---|
| 3,847,546 A | * | 11/1974 | Paul ....................... | G01N 30/12 436/157 |
| 5,442,949 A | * | 8/1995 | Kinoshita .............. | G01N 30/12 422/68.1 |
| 9,689,818 B2 | * | 6/2017 | Blumm .............. | G01N 25/4846 |

FOREIGN PATENT DOCUMENTS

| | | | | |
|---|---|---|---|---|
| JP | 06258285 A | | 9/1994 | |
| JP | H06-258285 | * | 9/1994 | ............. G01N 27/62 |

(Continued)

OTHER PUBLICATIONS

Saito, Y.; "Fundamentals of Thermal Analysis"; Kyoritsu Shuppan Co., Ltd., 1990; p. 300.

(Continued)

*Primary Examiner* — Peter J Macchiarolo
*Assistant Examiner* — John M Royston
(74) *Attorney, Agent, or Firm* — Whitmyer IP Group LLC

(57) ABSTRACT

A gas analysis device and a gas analysis method for performing measurement in a direct mode and a trap mode without carrying out a complicated control. The gas analysis device includes a branching section that branches a target gas, a mass spectrometer performing mass spectrometry of one branched target gas, a trap section holding the other branched target gas, a gas chromatograph analyzing the other branched target gas, and a controller controlling the flow path of the one branched target gas and the other branched target gas. The branching section is controlled so that, while a thermal analysis is performed by a thermal analysis device, the branching section continuously branches the supplied target gas and discharges the one branched target gas and the other branched target gas, and when the thermal analysis is completed, the other branched target gas held by the trap section is supplied to the gas chromatograph.

8 Claims, 7 Drawing Sheets

(51) Int. Cl.
*G01N 30/30* (2006.01)
*H01J 49/00* (2006.01)
*G01N 30/02* (2006.01)

(58) Field of Classification Search
CPC .. G01N 30/08; G01N 2030/125; G01N 30/12; G01N 27/62; G01N 30/02; H01J 49/004
See application file for complete search history.

(56) References Cited

FOREIGN PATENT DOCUMENTS

JP         2596882 B2     4/1997
WO    WO-2020084906 A1 *    4/2020   ............... G01N 1/00

OTHER PUBLICATIONS

Kinoshita, R., et al.; "The Optimization of the TG/DTA-MS Measurements and the Application for the Material Analysis"; J. Mass Spectrom. Soc. Jpn. 1998, vol. 46, No. 4; p. 365.

* cited by examiner

GAS ANALYSIS DEVICE AND GAS ANALYSIS METHOD

TECHNICAL FIELD

The present disclosure relates to a gas analysis device and a gas analysis method.

BACKGROUND

In order to determine the weight change associated with the thermal decomposition of a substance, or such characteristics as adsorption and desorption, frequently applied technology includes: a thermogravimetry (hereinafter referred to as "TG") that quantifies the weight change while changing the temperature of the sample; a differential thermal analysis (hereinafter referred to as "DTA") that measures the relative temperature change of a sample with reference to a reference substance associated with a phase transition or reactions; and TG-DTA that carries out these measurements simultaneously (Simultaneous Thermal Analysis; hereinafter referred to as "STA").

In the TG and STA described above, the gas generated accompanying the change in the weight of the sample cannot be identified. Therefore, as an effective means, a method is known wherein gas generated from a TG or STA device is introduced into a mass spectrometer (hereinafter referred to as "MS") to perform MS measurement in real time, synchronously with the TG or STA (direct mode by TG-MS or STA-MS)(see, for example, Non-Patent Literature 1).

In addition, when there are multiple gases generated and the analysis becomes complicated, as a further effective means for gas analysis, a method is known and generally applied wherein the generated gas is trapped and, after the TG or STA has been completed, the gas trapped is subjected to gas chromatography-mass spectrometry (hereinafter referred to as "GC/MS") is generally used as a further effective means of gas analysis (trap mode by the TG-GC/MS or STA-GC/MS) (see, for example, Patent Literature 1).

Patent Literature

PTL 1: JP 2596882 B2
PTL 2: JPH 06258285 A

Non-Patent Literature

NPL 1: KINOSHITA, R., et al., "Optimization of TG/DTA-MS Measuring Conditions and Application to Material Analysis", J. Mass Spectrum. Soc. Jpn, 1998, Vol. 46, No. 4, p. 365
NPL 2: SAITO, Y., "Fundamentals of Thermal Analysis", Kyoritsu Shuppan Co., Ltd., 1990, p. 300

SUMMARY OF INVENTION

Technical Problem

Explaining the direct mode of Non-patent Literature 1 and trap mode of Patent Literature 1 in the case of TG, it was conventionally necessary to carry out TG-MS and TG-GC/MS as separate measurements, and the both could not be carried out by a single measurement. Further, the connection between TG and MS and the connection between TG and GC/MS must be reestablished each time when the measurement mode is changed.

In connection with the problems described above, for example, Non-patent Literature 2 discloses an arrangement wherein the measurement in a direct mode with TG-MS and the measurement in trap mode with TG-GC/MS are switched by means of a knob. However, the gas chromatograph is of a packed column type and the arrangement cannot be applied to a gas chromatograph using a capillary column that is excellent in gas separation and forms a recent mainstream.

Furthermore, Patent Literature 2 discloses a gas analysis device that carries out a direct mode by TG-MS and a trap mode by TG-GC/MS by a single measurement, and connection switching by a valve. However, the flow path of the generated gas from the thermal analysis device must be switched between the mass spectrometer side and the trap section side during the thermal analysis, thereby leaving a room for improvement.

An object of the present invention made in view of those circumstances is to provide a gas analysis device and a gas analysis method capable of performing measurement in a direct mode and a trap mode without carrying out a complicated control.

Solution to Problem

In order to solve the problems described above, the gas analysis device according to the present disclosure is a gas analysis device that analyzes a target gas supplied from a thermal analysis device, comprising: a branching section that branches the analysis target gas; a mass spectrometer that carries out mass spectrometry of one branched target gas; a trap section that holds the other branched target gas; a gas chromatograph that analyzes the other branched target gas; and a controller that controls the flow path of the one branched target gas and the other branched target gas; wherein, while the thermal analysis is being carried out by the thermal analysis device, the branching section continuously branches the supplied target gas and discharges the one branched target gas and the other branched target gas; and wherein, after the thermal analysis has been completed, the other branched target gas held by the trap section is supplied to the gas chromatograph.

In the gas analysis device according to the present disclosure, with the constitution as described above, it is preferred that the controller is configured to carry out a control, by which, while the thermal analysis is being carried out, the one branched target gas that has passed through the branching section is supplied to the mass spectrometer, the other branched target gas that has passed through the branching section is supplied to the trap section, and a carrier gas is supplied to the gas chromatograph, and after the thermal analysis has been completed, the other branched target gas in the trap section is supplied to the gas chromatograph and the mass spectrometer section.

In the gas analysis device according to the present disclosure, with the constitution as described above, it is preferred that a flow path control of the one branched target gas and the other branched target gas by the controller is carried out by controlling a 10-port valve.

In the gas analysis device according to the present disclosure, with the constitution as described above, it is preferred that the target gas is branched in the thermal analysis device.

In order to solve the problems described above, the gas analysis method according to the present disclosure is a gas analysis method for analyzing a target gas supplied from a thermal analysis device, comprising: step for continuously branching the target gas supplied from the thermal analysis device while a thermal analysis is being carried out by the thermal analysis device; step for carrying out a mass spectrometry of the one branched target gas while the thermal analysis is being carried out; step for holding the other branched target gas while the thermal analysis is being carried out; and step for carrying out a gas chromatography and a mass spectrometry on the other branched target gas that has been held, after the thermal analysis has been completed.

Advantageous Effect

According to the present disclosure, it is possible to provide a gas analysis device and a gas analysis method capable of performing measurement in a direct mode and a trap mode without carrying out a complicated control.

DETAILED DESCRIPTION

Embodiments of the present disclosure will now be described with reference to the drawings.

Figure 1:
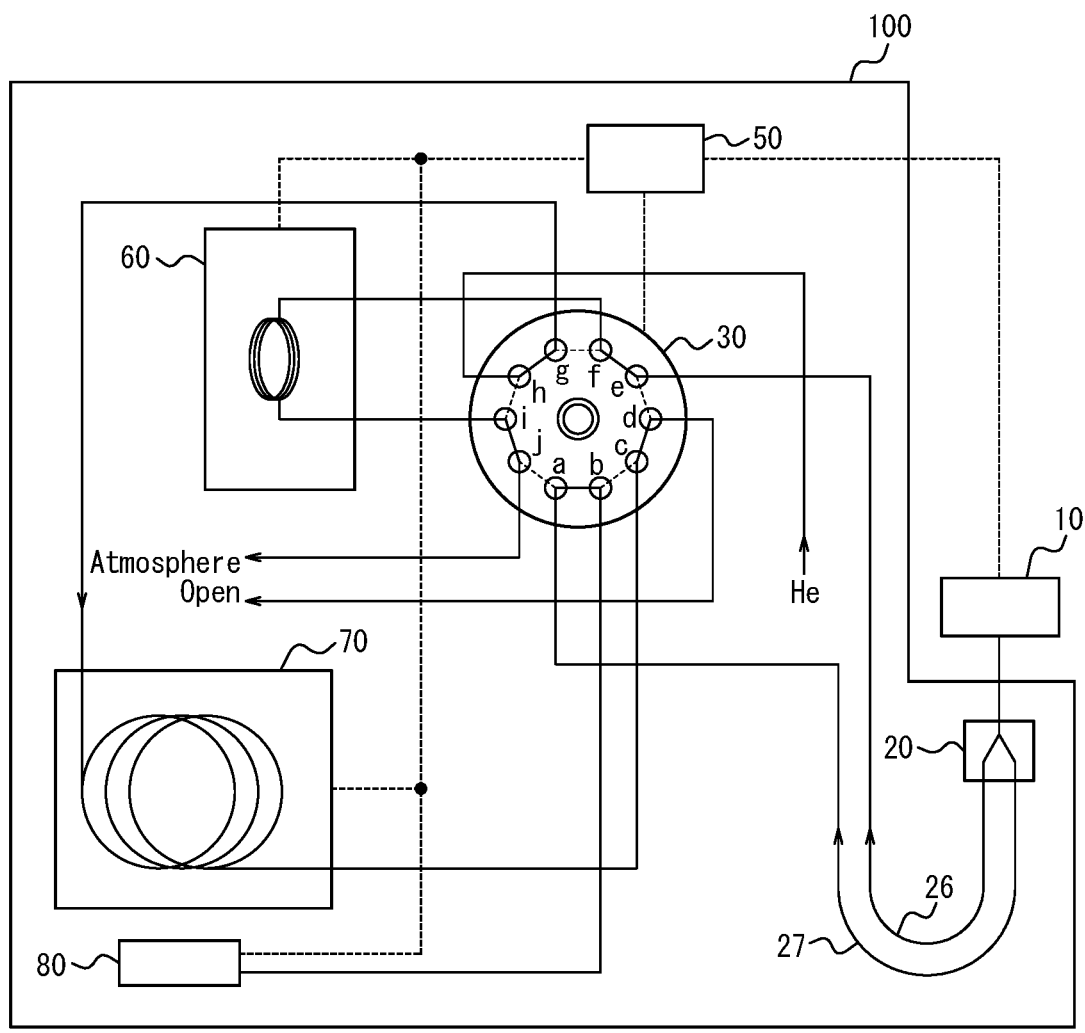
FIG. 1 is a diagram showing the structure of the gas analysis device according to an embodiment of the present disclosure.

FIG. 1 is a diagram illustrating a configuration of a gas analysis device 100 according to an embodiment of the present disclosure. The gas analysis device 100 according to the present embodiment includes a branching section 20 that branches a target gas generated by thermal analysis in a thermal analysis device such as a TG device 10, a mass spectrometer 80 that carries out a mass spectrometry of the one branched target gas, a trap section 60 that holds the other branched target gas, a gas chromatograph 70 for separating/analyzing the other branched target gas held in the trap section 60, a 10-port valve 30 that controls the flow path of the one branched target gas and the other branched target gas, and a controller 50 that controls the 10-port valve 30, the trap section 60, the gas chromatograph 70, the mass spectrometer 80, and the like. The control as used herein includes, for example, a case where a measurement trigger is transmitted to the gas chromatograph 70 and the mass spectrometer 80.

In FIG. 1, broken lines extending from the controller 50 to other functional sections indicate the flow of various control signals. Each control signal may be transmitted/received by wire or may be transmitted/received wirelessly.

Figure 2:
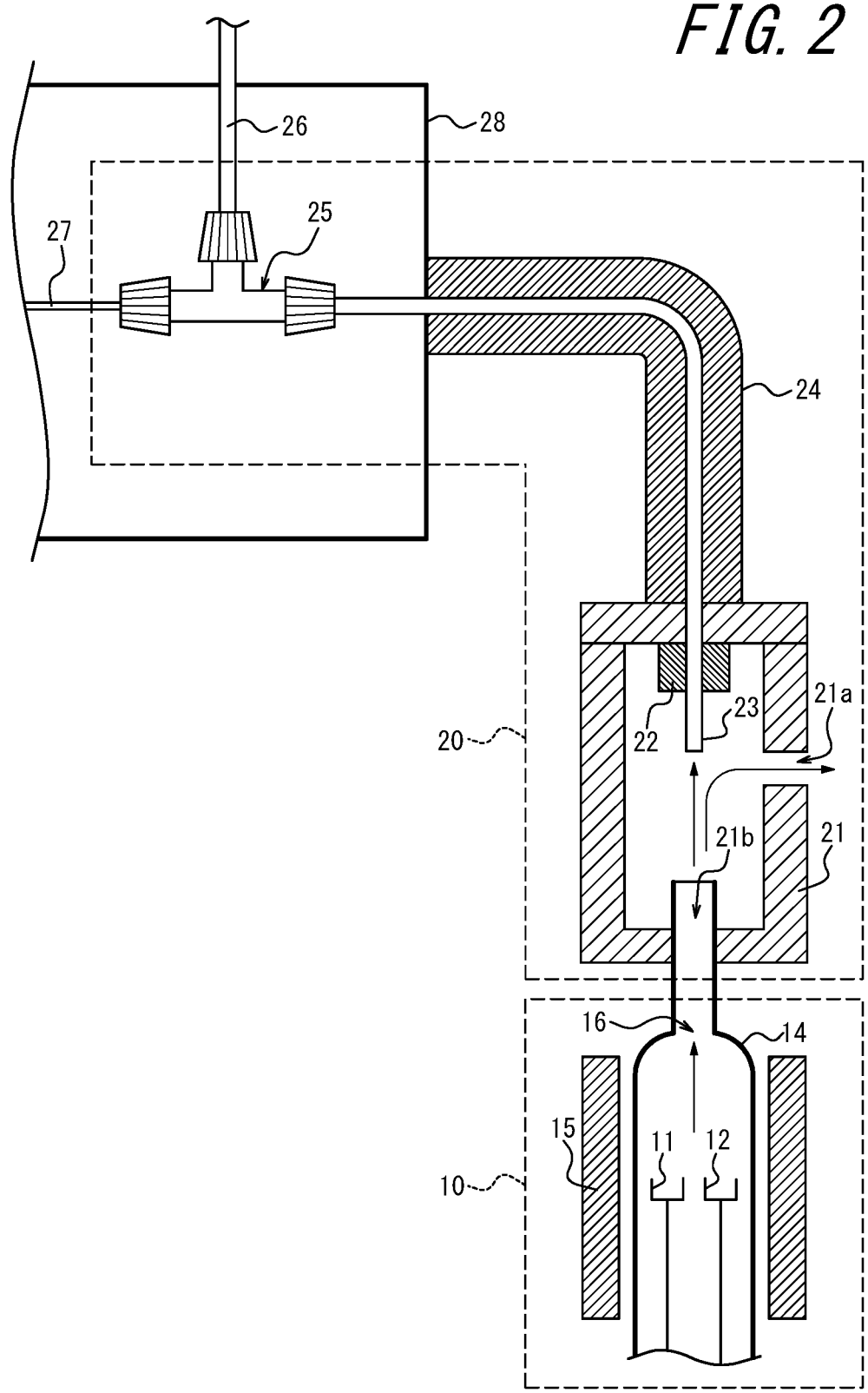
FIG. 2 is a diagram showing the structure of a branching section forming part of the gas analysis device according to an embodiment of the present disclosure.

The TG device 10 is a device that carries out thermogravimetry for quantifying the change in weight while changing the temperature of the sample. As shown in FIG. 2, the TG device 10 heats the sample placed on the sample container 11 and the reference substance placed on the sample container 12 with a heater 15 in the heating furnace 14, and measures the weight difference between the sample and the reference substance with an electromagnetic electronic balance to thereby measure the sample temperature and the weight change of the sample. An exhaust port 16 is provided at the upper end of the heating furnace 14, and a target gas generated from the sample by heating is supplied to the gas analysis device 100 from the exhaust port 16.

In the present embodiment, the gas analysis device 100 is described as not including the TG device 10, though the gas analysis device 100 may be configured as a system including the TG device 10.

The target gas generated during the thermal analysis in the TG device 10 is supplied to the branching section 20 provided in the gas analysis device 100, as shown in FIGS. 1 and 2. The branching section 20 branches the target gas from the TG device 10 into one target gas (indicated by a thick solid line in FIG. 4) and the other target gas (indicated by a thick broken line in FIG. 4).

FIG. 2 shows an example of the configuration of the branching section 20. The branching section 20 comprises a heating adapter 21 for receiving the target gas supplied from the TG device 10 and heats it at a predetermined temperature, a heating transfer tube 24 for heating a SUS fine tube 23 that supplies the target gas to the mass spectrometer 80 and the like, and a three-way joint 25 that branches the target gas to the mass spectrometer 80 side and the trap section 60 side. The branched target gases by the three-way joint 25 is supplied to the mass spectrometer 80 side via a capillary tube 27 and also supplied to the trap section 60 side via a further SUS fine tube 26.

The heating adapter 21 heats the target gas from the TG device 10 at a predetermined temperature. On the side of the heating adapter 21 that faces the gas inlet 21b of the analysis target gas, the SUS fine tube 23 is attached by a ferrule 22 for sending the target gas to the three-way joint 25. The SUS fine tube 23 is covered with the heating transfer tube 24, so that the target gas passing through the SUS fine tube 23 can be heated. As shown in FIG. 2, the heating adapter 21 is provided with a discharge port 21a, and the target gas that has not been sucked by the SUS fine tube 23 is discharged from the discharge port 21a.

The other end of the SUS fine tube 23 is connected to the three-way joint 25, as shown in FIG. 2. Part of the target gas flowing into the three-way joint 25 is supplied to the port a of the 10-port valve 30 via a capillary tube 27 (see FIG. 1). Further, another part of the target gas that has flowed into the three-way joint 25 is supplied to the port e of the 10-port valve 30 via a further SUS fine tube 26. It is preferred that the ports e-f of the 10-port valve 30, the trap section 60, and the ports i-j of the 10-port valve 30 are connected, and a suction pump (not shown) such as a diaphragm pump or a rotary pump is further connected on the downstream side, since suction from the branching section 20 to the trap section 60 is more actively induced. Furthermore, it is preferred that a needle valve or a mass flow controller (not shown) is arranged between the suction pump and the port j of the 10-port valve 30, since the amount of suction gas to the trap section 60 can be controlled, and introduction of an appropriate amount of the target gas into the trap section 60 can be controlled. The three-way joint 25 is arranged in the oven 28 and is set to a temperature that does not cause condensation when the target gas is branched.

In the present embodiment, as described above, the other target gas is supplied to the trap section 60 through the further SUS fine tube 26. The other target gas is actively suction-controlled by the suction pump and the mass flow controller and supplied to the trap section 60. The SUS fine tube 26 may use piping with a large internal diameter and may be configured to have a structure without the suction pump and the mass flow controller. One target gas supplied to the mass spectrometer 80 via the capillary tube 27 is sucked by the mass spectrometer 80 independently of the trap suction path described above. Then, the remaining target gas that has not been sucked into the mass spectrometer 80 and the trap section 60, and the carrier gas from the TG device 10 are discharged to the outside from the discharge port 21a. In this manner, the target gas discharged from the TG device 10 is naturally branched into the mass spectrometry path, the trap path, and the external discharge path.

Thus, the carrier gas introduced into the TG device 10 can be set completely independent of the target gas in type, flow rate, gas pressure, etc. Therefore, the thermal analysis in the TG device 10 can be carried out with measurements under the same conditions as when there is no connection with the gas analysis device 100.

Furthermore, the target gas taken into the trap suction path can be controlled in flow rate by a mass flow controller or the like, in order to control dilution or increase of the target gas.

The capillary tube 27 is comprised of a capillary tube having an inner diameter of about 0.2 mm to 0.5 mm, for example, and capable of transferring one target gas by a pressure difference at the end. In the present embodiment, the inside of the heating furnace 14 of the TG device 10 has a pressure close to the atmospheric pressure, whereas the ionization device of the mass spectrometer 80 is in a high vacuum. Thus, by this pressure difference, the one target gas from the heating furnace 14 can be supplied to the mass spectrometer 80. As the capillary tube 27, for example, a fused silica capillary tube or a SUS capillary tube that has been subjected to inner surface inactivation processing may be used. Note that one target gas does not necessarily have to be supplied to the mass spectrometer 80 only by the capillary tube 27, and may be connected to the mass spectrometer 80 via a valve or the like as shown in FIG. 1.

The SUS fine tube 23 and the further SUS fine tube 26 are comprised, for example, of pipes made of SUS having an outer diameter of about 1/16 inch or 1/8 inch. However, the present disclosure is not limited to this aspect, and other outer diameters and materials may be appropriately selected according to the flow rate, components, and the like of the target gas. Further, the SUS fine tube 23 and the further SUS fine tube 26 may have different outer diameters or inner diameters.

The 10-port valve 30 is comprised of a valve having 10 inlet/outlet ports a to j as shown in FIG. 1, and is controlled by the controller 50 to switch communication/non-communication between the ports a to j. In FIG. 1, the solid lines connecting port a and port b, port c and port d, port e and port f, port g and port h, and port i and port j indicate the connection state in the 10-port valve 30 in the direct mode wherein one target gas sent from the three-way joint 25 is supplied to the mass spectrometer 80 to perform mass spectrometry and the other target gas sent from the three-way joint 25 is supplied to and held by the trap section 60.

The broken lines connecting the ports b and c, the ports d and e, the ports f and g, the ports h and i, and the ports j and a indicate the connection state in the trap mode wherein, after completion of the thermal analysis by the TG device 10, the other target gas held in the trap section 60 is supplied to the gas chromatograph 70 to perform gas chromatography, and then to the mass spectrometer 80 to perform mass spectrometry. The controller 50 acquires information from the TG device 10 and switches and controls the connection of the 10-port valve 30 depending on whether or not the TG device 10 is performing thermal analysis.

The controller 50 controls the 10-port valve 30, the trap section 60, the gas chromatograph 70, the mass spectrometer 80, and the like. The controller 50 includes a microcomputer, and includes an input/output interface, a CPU (Central Processing Unit), a RAM (Random-Access Memory), a ROM (Read-Only Memory), and the like. The CPU can execute a control program. The RAM is adapted to temporarily store, for example, variables and calculation results necessary for program execution. The ROM is adapted to store a control program, for example.

The trap section 60 holds the other branched target gas that has been supplied from the three-way joint 25 via the further SUS fine tube 26 while the TG device 10 performs the thermal analysis. The target gas from the three-way joint 25 is supplied to the trap section 60 with a flow rate controlled by a mass flow controller and a diaphragm pump. The trap section 60 holds the other branched target gas and cools it with liquefied nitrogen or the like. The trap section 60 also includes a heater for instantaneously heating the target gas held thereby and supplying it to the gas chromatograph 70 when the TG device 10 completes the thermal analysis.

The gas chromatograph 70 includes an oven for vaporizing the other analysis target gas carried by the carrier gas (He) from the trap section 60, a capillary column for separating the analysis target gas into each compound, and a detector for detecting each separated compound. When performing gas chromatography, the oven raises the temperature of the capillary column from 40° C. to 300° C. at a substantially constant rate.

The mass spectrometer 80 performs mass spectrometry of one branched target gas directly supplied from the three-way joint 25 in the direct mode or the other branched target gas after performing gas chromatography. The mass spectrometer 80 includes an ionizer for ionizing the supplied target gas, an electrode for forming an electric field, and an ion detector.

Next, the procedure for carrying out the gas analysis method according to the present embodiment using the gas analysis device 100 shown in FIG. 1 will be described with reference to FIGS. 3 to 5.

First, the controller 50 of the gas analysis device 100 communicates with the TG device 10 to determine whether or not the TG device 10 is performing thermal analysis (thermogravimetric measurement) (step S101). This determination is performed, for example, when the controller 50 performs serial communication with the TG device 10 and acquires the current state of the TG device 10. The controller 50 may be configured such that it determines that the thermal analysis is being performed (determines "Yes" in step S101) until the thermal analysis end trigger signal is received from the TG device 10 in step S101, and continues the direct mode.

When the controller 50 determines in step S101 that the TG device 10 is carrying out the thermal analysis (in the case of "Yes" in step S101), the controller 50 performs control to continue the direct mode state. The controller 50 determines that the thermal analysis is being carried out ("Yes" in step S101) when, for example, the thermal analysis end trigger signal is not received from the TG device 10. The controller 50 causes the target gas discharged from the heating furnace 14 of the TG device 10 for branching at the branching section 20 (step S103). For example, the branching of the analysis target gas may be carried out by the controller 50, by controlling the supply of the carrier gas to the TG device 10 so that the analysis target gas from the TG device 10 flows to the gas analysis device 100 side.

As shown in FIG. 2, the branching of the target gas in the branching section 20 is realized as shown in FIG. 2 by the three-way joint 25 that dividing the target gas, which has been supplied through the SUS fine tube 23, into a flow path leading to the mass spectrometer 80 and into a flow path leading to the trap section 60. In other words, in the present embodiment, the supplied target gas is always branched at the branching section 20 and discharged as being divided into one branched target gas and the other branched target gas. Therefore, it is not necessary to switch the flow path of the generated gas from the TG device 10 between the mass spectrometer 80 side and the trap section 60 side during the thermal analysis. In these respects, the gas analysis device 100 according to the present embodiment is configured significantly different from the device of Patent Literature 2 in which gas is discontinuously supplied by being alternately switched between the mass spectrometer side and the gas trap side during thermal analysis.

Figure 4:
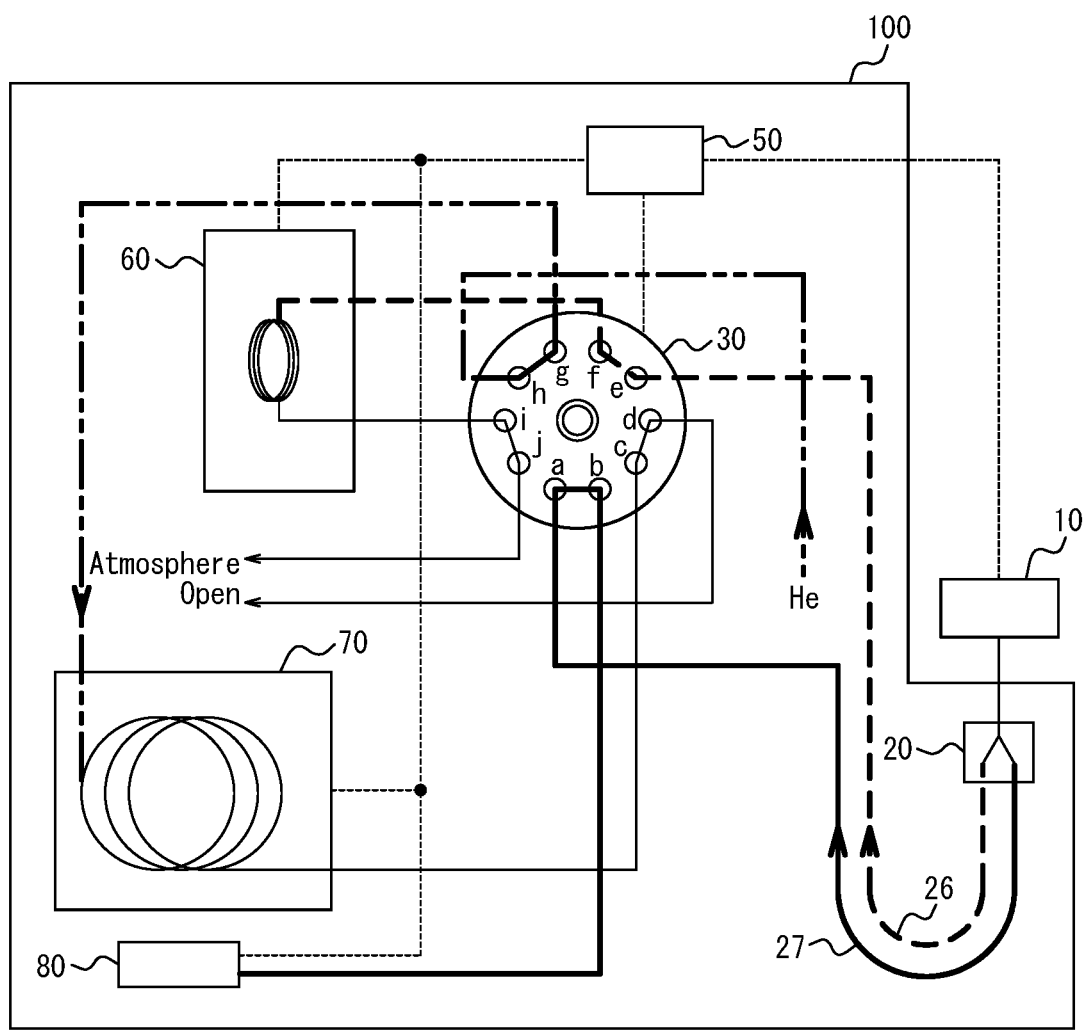
FIG. 4 is a diagram showing the status of the valve and the gas flow in the direct mode of the gas analysis device according to an embodiment of the present disclosure.

In the direct mode, the 10-port valve 30 is set to the state shown in FIG. 4, and the branching section 20 and the mass spectrometer 80 are directly connected via the capillary tube 27 and the ports a and b of the 10-port valve 30. Therefore, one branched target gases is directly introduced into the mass spectrometer 80 where mass spectrometry is performed (step S105). In FIG. 4, the flow of one branched target gas is indicated by a thick solid line. The synchronization between the thermal analysis in the TG device 10 and the mass spectrometry in the mass spectrometer 80 may be performed directly between the devices.

In the direct mode, at the same time, the other branched target gas among the gases to be analyzed as being branched in the branching section 20 is held in the trap section 60 through the ports e and f of the 10-port valve 30 (step S107). Further, the controller 50 cools the other branched target gas supplied to the trap section 60 with liquefied nitrogen. In FIG. 4, the flow of the other branched target gas is indicated by a thick broken line.

Figure 3:
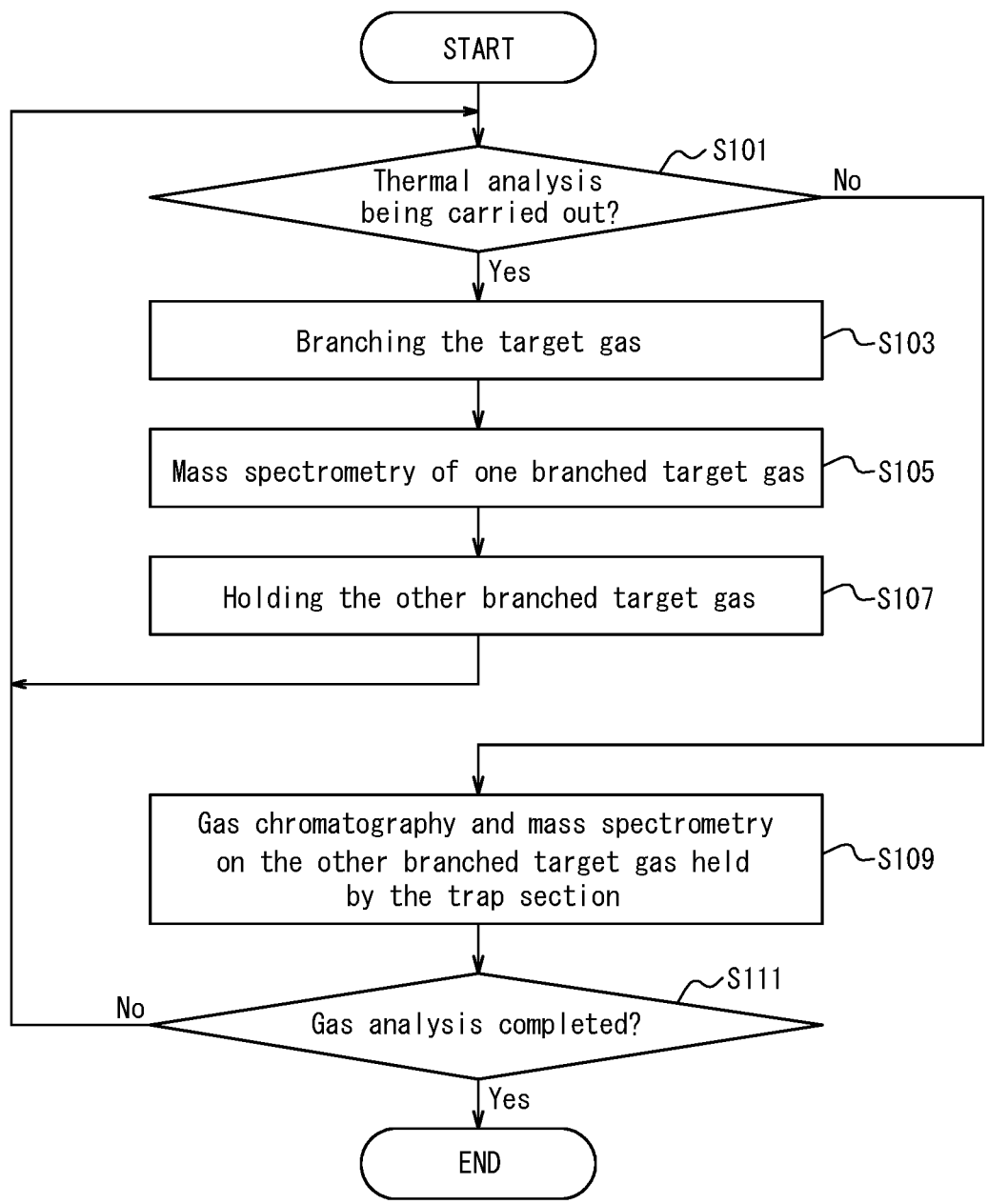
FIG. 3 is a flow chart showing the procedure for carrying out a gas analysis method according to an embodiment of the present disclosure.

In addition, in the flowchart shown in FIG. 3, although it describes that step S107 is performed after step S105, it is preferred that the steps S103 to S107 are carried out in parallel. In particular, it is preferred that the control of the 10-port valve 30 is carried out at the same time as the switching necessary between step S105 and step S107.

Further, in the direct mode, as shown in FIG. 4, the port g and the port h are fluidly connected, and He gas flowing into the port h is discharged from the port g, and injected into the capillary column via the SUS fine tube and the injection port of the gas chromatograph 70.

In the direct mode, the ports c and d and the ports i and j are fluidly connected until the thermal analysis measurement of the TG device 10 is completed. Thereby, one ends of the trap section 60 and the gas chromatograph 70 are opened to atmosphere.

On the other hand, if the controller 50 determines in step S101 that the TG device 10 is not carrying out thermal analysis (in the case of "No" in step S101), the controller 50 performs control in the trap mode. The controller 50 determines in step S101 that the TG device 10 is not carrying out thermal analysis when, for example, a measurement end trigger signal is received from the TG device 10, ("No" in step S101). The controller 50 carries out gas chromatography mass spectrometry (GC/MS) on the other branched target gas that has been held by the trap section (step S109). As shown in FIG. 5, the execution of step S109 is carried out by the controller 50 controlling the 10-port valve 30 to fluidly connect the port f and port g and the port h and port i. At this time, the controller 50 heats the other branched target gas held in the trap section 60 with a heater. As a result, He gas that has flowed into the port h flows out of the port i and is supplied to the trap section 60. Therefore, the other branched target gas in the trap section 60 is heated by the heater and transferred by the He gas. The gas is supplied to the injection port of the gas chromatograph 70 via the port f and the port g. The controller 50 simultaneously outputs a trigger signal for starting measurement to the gas chromatograph 70 for starting GC/MS.

Figure 5:
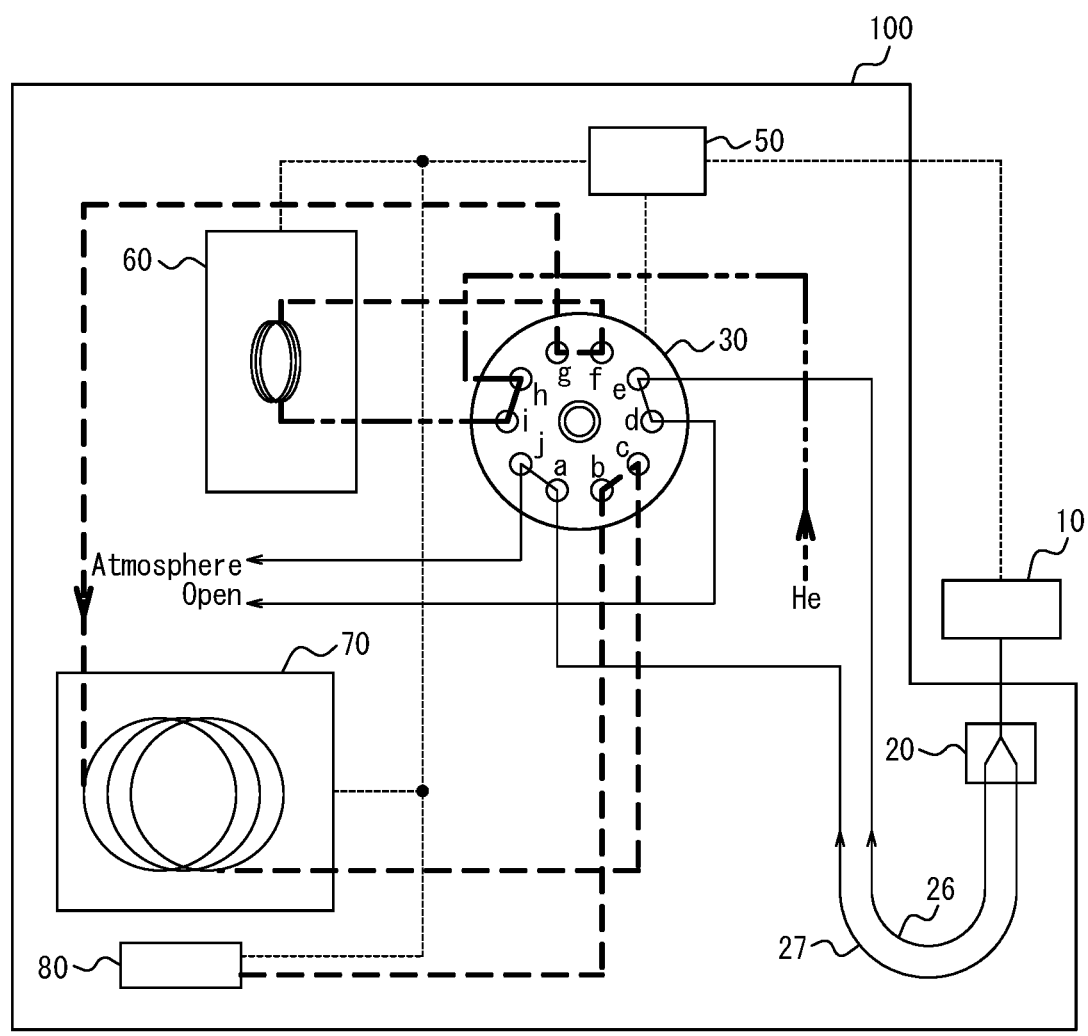
FIG. 5 is a diagram showing the status of the valve and the gas flow in the trap mode of the gas analysis device according to an embodiment of the present disclosure.

Further, in the trap mode in which GC/MS is carried out, as shown in FIG. 5, the port b and the port c are fluidly connected by the 10-port valve 30 to carry out the GC/MS. In FIG. 5, the flow of the other branched target gas is indicated by a thick broken line.

In the trap mode in which GC/MS is carried out, the ports d and e, and the ports j and a are further fluidly connected. Thereby, one ends of the capillary tube 27 and the further SUS fine tube 26 from the branching section 20 are opened to atmosphere.

As described above, by adopting the 10-port valve 30, the controller 50 is capable of switching between mass spectrometry (MS) in the direct mode and GC/MS on the target gas held by the trap section 60 by a simple control of the 10-port valve 30 only once. Further, while performing mass spectrometry in the direct mode, He gas as a carrier gas can be continuously supplied to the capillary column of the gas chromatograph 70. Therefore, the deterioration of the capillary column is prevented, and the state of the capillary column is stable during the GC/MS carried out after the direct mode, so that GC/MS can be started immediately.

In this embodiment, the 10-port valve 30 is used. However, it is apparent that a similar system may be obtained by combining a plurality of 4-port, 6-port, or 8-port valves and simultaneously switching each port valve. It goes without saying that a similar system can be obtained even if only 10 ports of 12 or more port valves are used.

Further, with the end of the direct mode (that is, the end of the thermal analysis measurement of the TG device 10) as a trigger, the controller 50 is capable of sequentially controlling the switching of the 10-port valve 30, heater control of the trap section 60, starting of GC/MS, ending of GC/MS, re-switching of the 10 port valve 30 (re-switching from the trap mode to the direct mode) and the like. Therefore, thermal analysis/MS/trapping (direct mode) and GC/MS (trap mode) can be realized as a series of continuous automatic measurements.

In addition, by adopting an autosampler in the TG device 10, the above-described automatic measurements can be realized for a plurality of samples.

The controller 50 determines whether or not to end the gas analysis after step S109 (Step S111) and ends the control if the gas analysis should be ended ("Yes" in Step S111). On the other hand, when it is determined that the gas analysis should be continued (in the case of "No" in step S111), the process returns to step S101 to continue the control.

Figure 6:
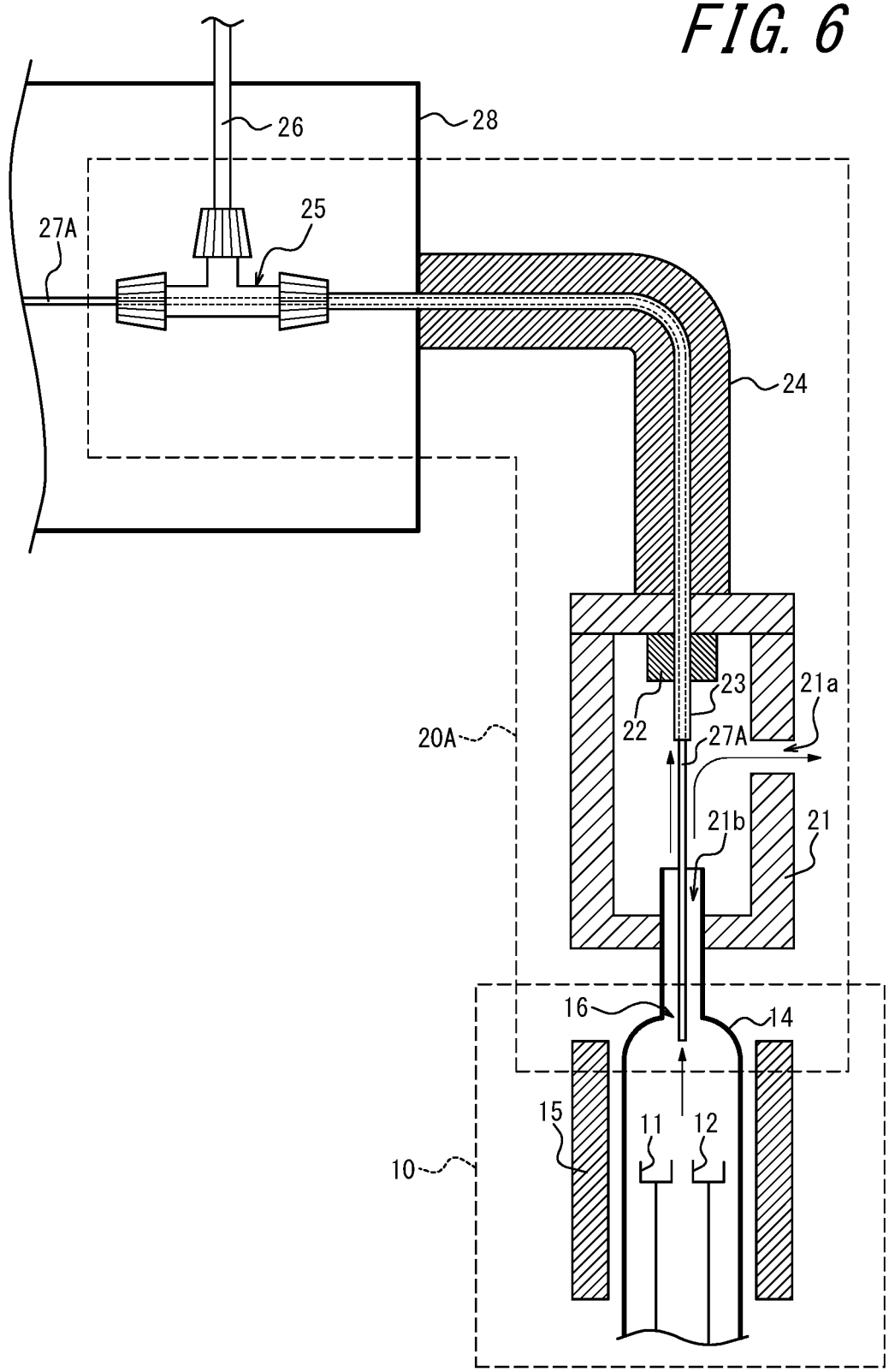
FIG. 6 is a diagram showing a first variation of the branching section forming part of the gas analysis device according to an embodiment of the present disclosure.
Figure 7:
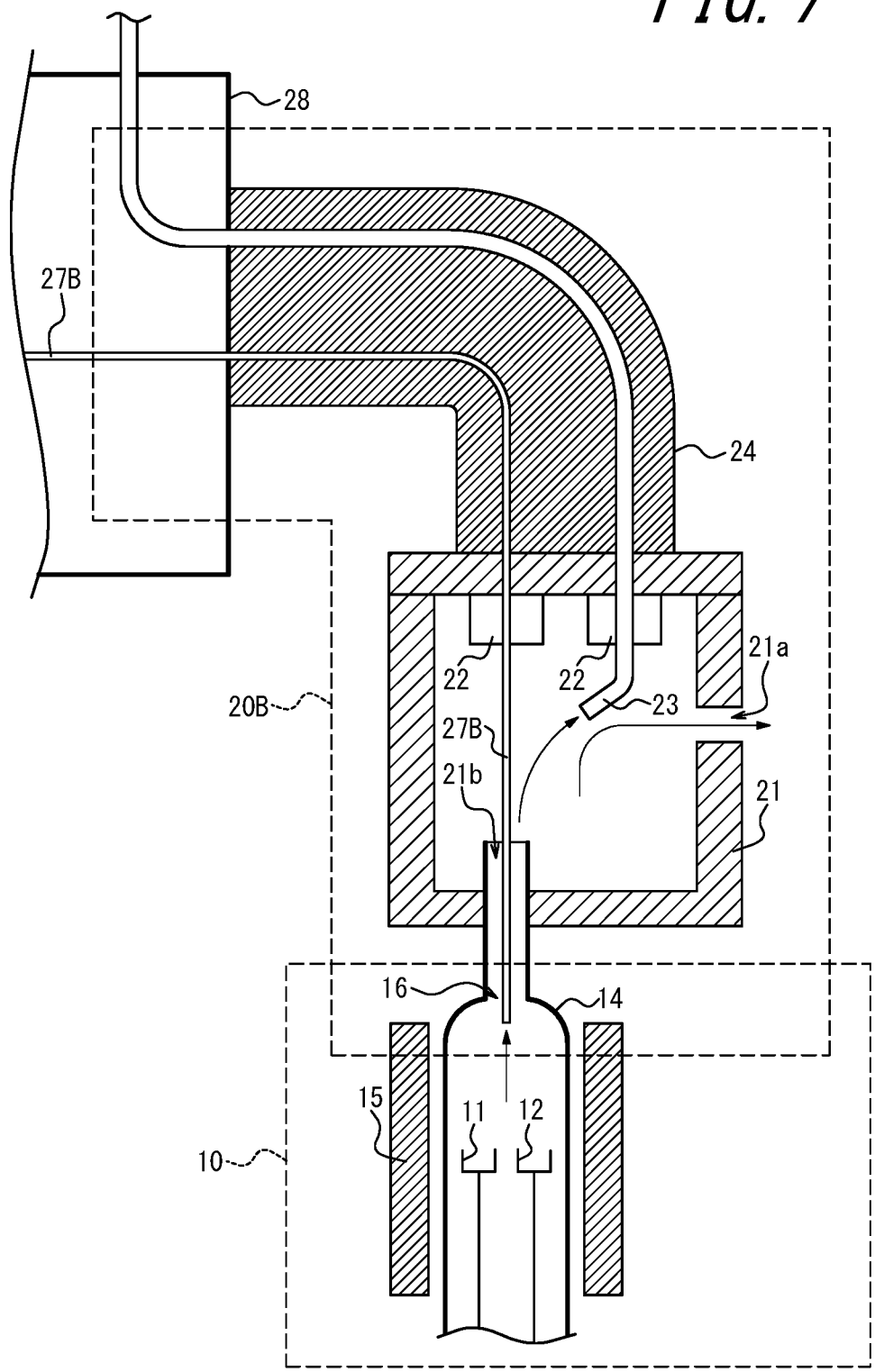
FIG. 7 is a diagram showing a second variation of the branching section forming part of the gas analysis device according to an embodiment of the present disclosure.

It should be noted that the configuration of the branching section 20 shown in FIG. 2 is not limited to this aspect, and there may be adopted configuration as shown in FIG. 6 or 7 by way of example.

FIG. 6 shows a branching section 20A that is a first variation of the branching section 20. In the first variation, as compared with the branching section 20 shown in FIG. 2, the difference resides in that the TG device 10 side of the capillary tube 27A passes through the three-way joint 25, the SUS fine tube 23 and the heating adapter 21, and extends further beyond the inlet 21b of the heating adapter 21 into the heating furnace 14 of the TG device 10. That is, according to the first variation of the branching section 20, in the direct mode, the flow path of the one branched target gas supplied to the mass spectrometer 80 and the flow path of the other branched target gas supplied to the trap section 60 are substantially branched in the heating furnace 14 of the TG device 10. With such a configuration, it is possible to more stably supply the target gas from the TG device 10 to the mass spectrometer 80 in the direct mode.

FIG. 7 shows a branching section 20B that is a second variation of the branching section 20. The second variation is different from the first variation in that the three-way joint 25 is not used. The capillary tube 27B having one end arranged in the heating furnace 14 in the same manner as that in the first variation is fixed to the heating adapter 21 by a second ferrule 22 that is different from the SUS fine tube 23, and directly supplies the target gas to the mass spectrometer 80 through a path different from that of the SUS fine tube 23. That is, also according to the second variation of the branching section 20, in the direct mode, the flow path of one analysis target gas supplied to the mass spectrometer 80 and the flow path of the other analysis target gas supplied to the trap section 60 are substantially branched in the heating furnace 14 of the TG device 10. With such a configuration, the one branched target gas can be stably supplied directly to the mass spectrometer 80 without hindering the flow of the other analysis target gas.

Note that "supplying the analysis target gas directly to the mass spectrometer 80" does not mean that one end of the capillary tube extends to the mass spectrometer 80. Rather, it means that the one branched target gas is supplied to the mass spectrometer 80 without being held at the trap section 60 or being analyzed by the gas chromatograph 70.

As described above, the present embodiment provides a gas analysis device 100 that analyzes a target gas supplied from a thermal analysis device (TG device 10), which comprises a branching section 20 that branches the analysis target gas, a mass spectrometer 80 for performing mass spectrometry of one branched target gas, a trap section 60 that holds the other branched target gas, a gas chromatograph 70 that analyzes the other branched target gas held by the trap section 60, and a controller 50 that controls the flow path of the one branched target gas and other branched target gas, wherein the branching section 20 continuously branches the supplied target gas while the thermal analysis is being performed by the thermal analysis device, to discharges one branched target gas and the other branched target gas, and supplies the other branched target gas held by the trap section 60 to the gas chromatograph 70 when the thermal analysis has been completed. By adopting such a configuration, during the thermal analysis, the target gas supplied from the TG device 10 is always continuously branched by the branching section 20 and discharged to the mass spectrometer 80 side and the trap section 60 side. Thus, there is no need to switch the flow path between the mass spectrometer 80 side and the trap section 60 side during the thermal analysis. In addition, since the target gas is always discharged to the mass spectrometer 80 side and the trap section 60 side while the target gas is being supplied, the target gas is prevented from being supplied discontinuously to the mass spectrometer 80 in the direct mode. Therefore, the accuracy of mass spectrometry in the direct mode can be increased.

In the present embodiment, the controller 50 is configured so that, while the thermal analysis is being performed, the one branched target gas passed through the branching section 20 is supplied to the mass spectrometer 80, the other branch of the target passed through the branching section 20 is supplied to the trap section 60, and the carrier gas is supplied to the gas chromatograph 70, and when the thermal analysis has been completed, the target gas within the trap section 60 is supplied to the gas chromatograph 70 and the other branched target gas in the trap section 60 is supplied to the gas chromatograph 70 and the mass spectrometer 80. By adopting such a configuration, it is possible to continuously supply He gas as a carrier gas to the capillary column of the gas chromatograph 70 while performing mass spectrometry in the direct mode. Therefore, the deterioration of the capillary column can be prevented, and the state of the capillary column can be made stable during the GC/MS performed after the direct mode, thereby allowing the GC/MS to be started immediately.

Further, in the present embodiment, the flow control of the one branched target gas and the other branched target gas by the controller 50 is configured to be carried out by the controller 50 controlling the 10-port valve 30. By adopting such a configuration, the controller 50 can perform switching between the mass spectrometry in the direct mode and GC/MS (trap mode) of the retained target gas by a simple control that switches the 10-port valve 30 only once.

In the present embodiment, the target gas is configured to be branched in the thermal analysis device (TG device 10). By adopting such a configuration, it is possible to more stably supply the target gas from the TG device 10 to the mass spectrometer 80 in the direct mode.

Furthermore, the gas analysis method according to the present embodiment is a gas analysis method for analyzing a target gas supplied from a thermal analysis device (TG device 10), wherein the method comprises step of continuously branching the target gas supplied form the thermal analysis device while the thermal analysis is being carried out by the thermal analysis device, step of performing mass spectrometry of one branched target gas while the thermal analysis is being carried out, step of holding the other branched target gas, and step of performing gas chromatography and mass spectrometry on the held other analysis target gas after the thermal analysis has been completed. By adopting such a configuration, the target gas supplied from the TG device 10 is always continuously branched at the branching section 20 and discharged to the mass spectrometer 80 side and the trap section 60 side, thereby requiring no switching of the flow path between the mass spectrometer 80 side and the trap section 60 side. In addition, since the target gas is always discharged to the mass spectrometer 80 side and the trap section 60 side while the target gas is being supplied, the target gas is prevented from being supplied discontinuously to the mass spectrometer 80 in the direct mode. Therefore, the accuracy of mass spectrometry in the direct mode can be improved.

Although the present disclosure has been described with reference to the drawings and examples, it should be noted that those skilled in the art could easily make various changes or variations based on the present disclosure. Therefore, it should be noted that these variations or variations are included in the scope of the present invention. For example, the functions included in each component, each step, etc. can be rearranged so long as they are logically compatible, and a plurality of components, steps, etc. can be combined into one or divided.

For example, in the present embodiment, TG is used as the thermal analysis device, but the present disclosure is not limited to this aspect. DSC, DTA, and various STAs may be used as the thermal analysis device.

The invention claimed is:

1. A gas analysis device that analyzes a target gas supplied from a thermal analysis device, comprising:
    a branching section that branches the target gas;
    a mass spectrometer that carries out mass spectrometry of one branched target gas;
    a trap section that holds the other branched target gas;
    a gas chromatograph that analyzes the other branched target gas held by the trap section; and
    a controller that controls the flow path of the one branched target gas and the other branched target gas;
    wherein, while the thermal analysis is being carried out by the thermal analysis device, the branching section continuously branches the supplied target gas by dividing the supplied target gas into the one branched target gas and the other branched target gas and discharges the one branched target gas and the other branched target gas; and
    wherein, after the thermal analysis has been completed, the other branched target gas held by the trap section is supplied to the gas chromatograph.

2. The gas analysis device according to claim 1, wherein the controller is configured to carry out a control, by which,
    while the thermal analysis is being carried out,
        the one branched target gas passed through the branching section is supplied to the mass spectrometer,
        the other branched target gas passed through the branching section is supplied to the trap section, and
        a carrier gas is supplied to the gas chromatograph, and
    after the thermal analysis has been completed,
        the other branched target gas in the trap section is supplied to the gas chromatograph and the mass spectrometer section.

3. The gas analysis device according to claim 1, wherein flow path control of the one branched target gas and the other branched target gas by the controller is carried out by controlling a 10-port valve.

4. The gas analysis device according to claim 1, wherein the target gas is branched in the thermal analysis device.

5. The gas analysis device according to claim 2, wherein flow path control of the one branched target gas and the other branched target gas by the controller is carried out by controlling a 10-port valve.

6. The gas analysis device according to claim 2, wherein the target gas is branched in the thermal analysis device.

7. The gas analysis device according to claim 3, wherein the target gas is branched in the thermal analysis device.

8. A gas analysis method for analyzing a target gas supplied from a thermal analysis device, comprising:
    step for continuously branching the target gas supplied from the thermal analysis device by dividing the supplied target gas into one branched target gas and an other branched target gas while a thermal analysis is being carried out by the thermal analysis device;
    step for carrying out mass spectrometry of the one branched target gas while the thermal analysis is being carried out;
    step for holding the other branched target gas while the thermal analysis is being carried out; and
    step for carrying out a gas chromatography and a mass spectrometry on the other branched target gas that has been held, after the thermal analysis has been completed.

* * * * *